(12) United States Patent
Chu

(10) Patent No.: US 12,444,320 B2
(45) Date of Patent: Oct. 14, 2025

(54) TRAVELING WAVE DEMONSTRATING DEVICE

(71) Applicant: National Central University, Taoyuan (TW)

(72) Inventor: Ching-Chi Chu, Taoyuan (TW)

(73) Assignee: National Central University, Taoyuan (TW)

( * ) Notice: Subject to any disclaimer, the term of this patent is extended or adjusted under 35 U.S.C. 154(b) by 584 days.

(21) Appl. No.: 17/969,292

(22) Filed: Oct. 19, 2022

(65) Prior Publication Data
US 2024/0112600 A1    Apr. 4, 2024

(30) Foreign Application Priority Data
Sep. 30, 2022    (TW) .................................. 111137403

(51) Int. Cl.
*G09B 23/06*    (2006.01)
(52) U.S. Cl.
CPC .................... *G09B 23/06* (2013.01)
(58) Field of Classification Search
CPC ...................................................... G09B 23/06
See application file for complete search history.

(56) References Cited

U.S. PATENT DOCUMENTS

| | | | | | |
|---|---|---|---|---|---|
| 2,160,131 | A | * | 5/1939 | Doerfler | G09B 23/06 434/126 |
| 3,453,747 | A | * | 7/1969 | Saunders | G09B 23/02 434/215 |
| 3,518,780 | A | * | 7/1970 | Stewart | G09B 23/06 434/300 |

FOREIGN PATENT DOCUMENTS

| | | | | |
|---|---|---|---|---|
| CN | 2498688 Y | | 7/2002 | |
| CN | 104537929 A | * | 4/2015 | ............ G09B 23/06 |
| CN | 207781025 U | | 8/2018 | |
| CN | 209708429 U | | 11/2019 | |
| CN | 111435576 A | * | 7/2020 | ............ G09B 23/06 |
| CN | 113763785 A | * | 12/2021 | ............ G09B 23/06 |
| CN | 114429724 A | * | 5/2022 | ............ G09B 23/06 |
| SU | 911595 A1 | * | 3/1982 | |

* cited by examiner

*Primary Examiner* — Milap Shah
(74) *Attorney, Agent, or Firm* — Demian K. Jackson; Jackson IPG PLLC

(57) ABSTRACT

The present invention relates to a traveling wave demonstrating device. The device includes a base structure including a time window, a plurality of x-axis scales, a plurality of medium slots and a set of linear track former to form a traveling wave channel, each of which the plurality of medium slots are providing for a medium to have a free motion therein; and a traveling wave substrate movably configured on the traveling wave channel and including a plurality of time scales and a wave form opening, wherein the medium is configured to put into both the wave form opening and one of the plurality of medium slots, and when the traveling wave substrate moves along the traveling wave channel, the medium is driven to have a reciprocal motion confined in the one of the plurality of medium slots.

10 Claims, 5 Drawing Sheets

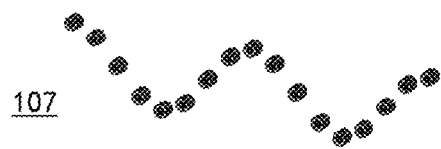
FIG. 6
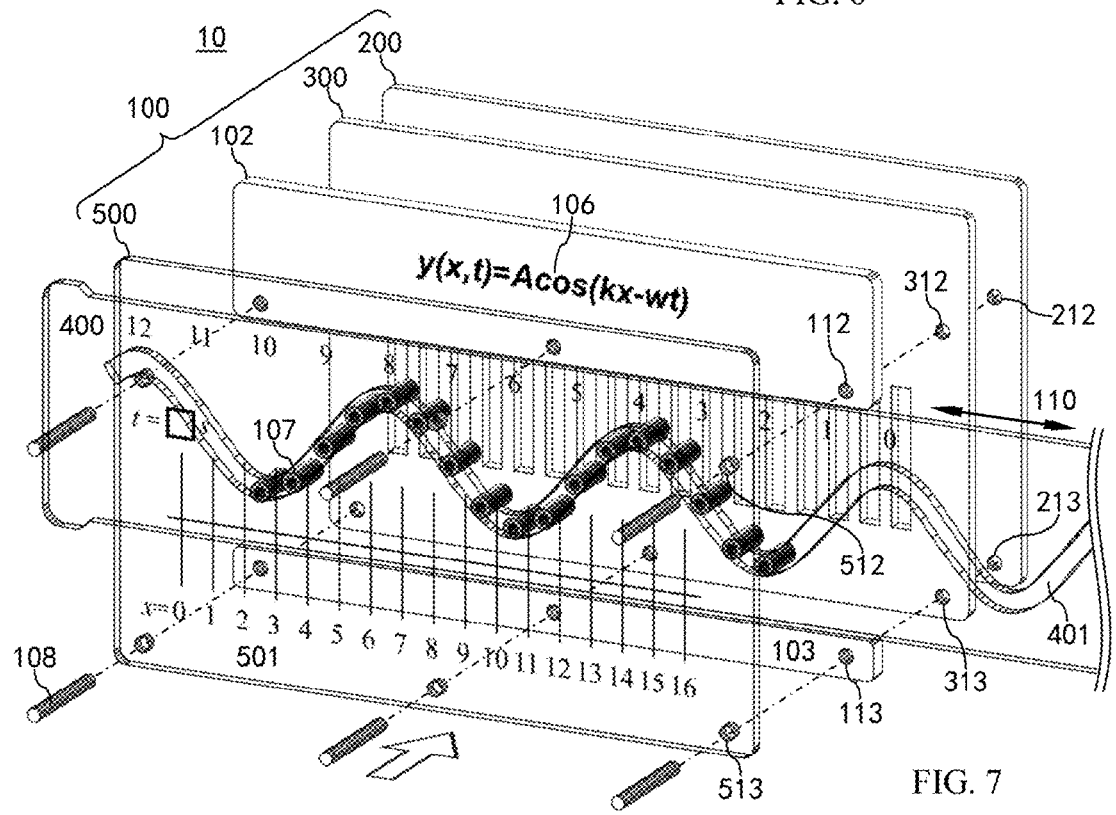
FIG. 7
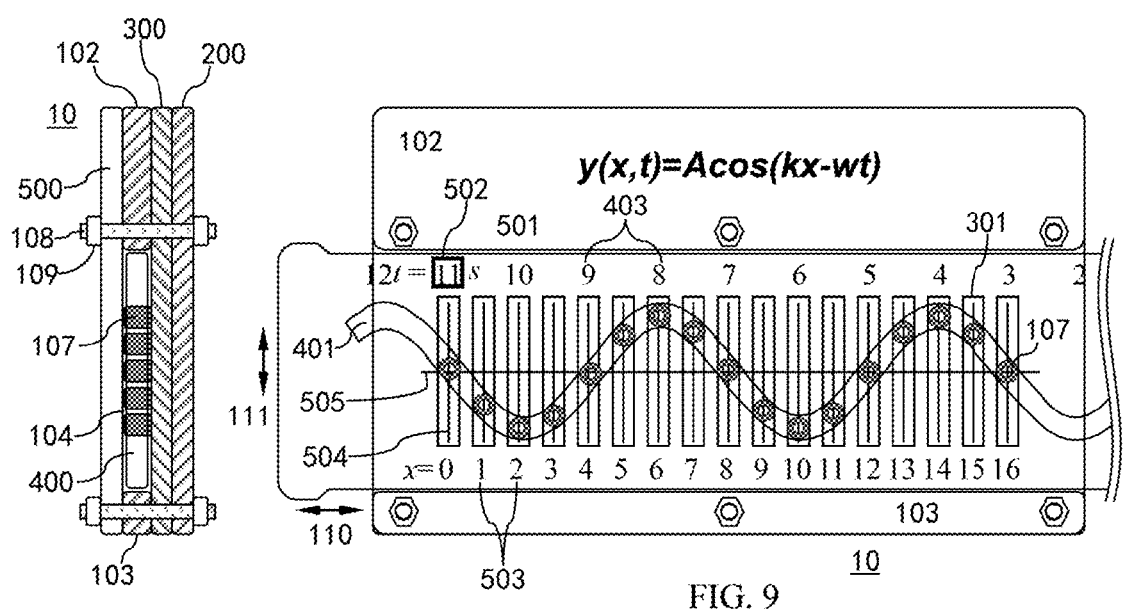
FIG. 8
FIG. 9

TRAVELING WAVE DEMONSTRATING DEVICE

CROSS-REFERENCE TO RELATED APPLICATION

This application claims priority benefit to Taiwan Invention Patent Application Serial No. 111137403, filed on Sep. 30, 2022, in Taiwan Intellectual Property Office, the entire disclosures of which are incorporated by reference herein.

FIELD

The present invention relates to a traveling wave demonstrating device, in particular to a handheld and non-electric driven traveling wave demonstrating device.

BACKGROUND

In the field of basic science education, the traveling wave is a very important basic physics concept. When the physics courses enter into the education for the principle of wave equation, the multiple physics phenomena resulted from the traveling wave is undoubtedly one of teaching focuses, and play key roles for understanding the characteristics of wave motion.

The traveling wave has many observable characteristics including but not limited to: the direction of wave propagation different from the vibrating direction of medium and the medium performing a reciprocating motion in situ. However, as for beginners, the direction of wave propagation, the medium vibration and the medium performing a reciprocating motion are abstract ideas. Learners usually need to rely on schematic diagrams and require a little capability of imagination to initially get a little idea to the traveling wave phenomenon.

In the field of traditional physics education, there are some relevant teaching aids or experiment instruments provided as well. The issues are that, these traditional teaching aids usually have a relative large size, are merely suitable for operating independently in laboratory classrooms and fail to move into ordinary classrooms for demonstration. Also it requires being driven relying upon external power, and the operations thereof are also much complicated. Moreover, according to learners' feedbacks, after watching the demonstrations by these traditional teaching aids, many learners still have little understanding to special physical phenomena resulted from the traveling wave.

Hence, there is a need to solve the above deficiencies/issues.

SUMMARY

The present invention relates to a traveling wave demonstrating device, in particular to a handheld and non-electric driven traveling wave demonstrating device.

The present invention provides a traveling wave demonstrating device. The device includes a time window, a plurality of x-axis scales, a plurality of medium slots and a set of linear track former to form a traveling wave channel, each of which the plurality of medium slots are providing for a medium to have a free motion therein; and a traveling wave substrate movably configured on the traveling wave channel and including a plurality of time scales and a wave form opening, wherein the medium is configured to put into both the wave form opening and one of the plurality of medium slots, and when the traveling wave substrate moves along the traveling wave channel, the medium is driven to have a reciprocal motion confined in the one of the plurality of medium slots.

Preferably, the base structure further includes one of a backboard; a slot substrate selectively attached to the backboard and including the plurality of medium slots; and a scale display panel including the time window and the plurality of x-axis scales that are corresponded to the plurality of medium slots in position and in amounts, wherein the time window is corresponded to one of the plurality of time scales in position.

Preferably, the set of linear track former further includes one of an upper track plate attached to the slot substrate and including a symbol area showing a wave equation including a symbol selected from one of a vertical position variable y, a horizontal position variable x, a time variable t, an amplitude constant A, a wavenumber k, an angular frequency $\omega$, a sine function and a cosine function; and a lower track plate attached to the slot substrate, wherein the traveling wave channel is formed between the upper track plate and the lower track plate; and the scale display panel attached to the upper track plate and the lower track plate.

Preferably, the wave form opening has a height and a wave shape in sine wave or cosine wave and includes at least two complete wave form.

Preferably, the plurality of x-axis scales represents the horizontal position variable x in the wave equation, the plurality of time scales represents the time variable t in the wave equation, a current position of the medium in the one of the plurality of medium slots represents the vertical position variable y in the wave equation, the height of the wave form opening represents the amplitude constant A in the wave equation, and the wave shape represents the sine function or the cosine function.

Preferably, the plurality of x-axis scales and the plurality of time scales are corresponded and correlated with each other in position and labeled in phase angle to represent the wavenumber k and the angular frequency $\omega$ in the wave equation respectively.

Preferably, when the traveling wave substrate is driven to move horizontally along the traveling wave channel to simulate a traveling wave with a wave propagation, the result that the medium is confined in the one of the plurality of medium slots to have the reciprocal motion demonstrates a physical phenomenon for the traveling wave that a particle periodically oscillates in situ rather than moves forward with the wave propagation.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIG. 6 is a perspective-view schematic diagram illustrating the structure for the media according to the present invention;

FIG. 7 is an exploded-view schematic diagram illustrating the exploded structure for the traveling wave demonstrating device according to the present invention;

FIG. 8 is a side-view schematic diagram illustrating the assembled structure for the traveling wave demonstrating device according to the present invention;

FIG. 9 is a front-view schematic diagram illustrating the assembled structure for the traveling wave demonstrating device according to the present invention;

DETAILED DESCRIPTION

Figure 1:
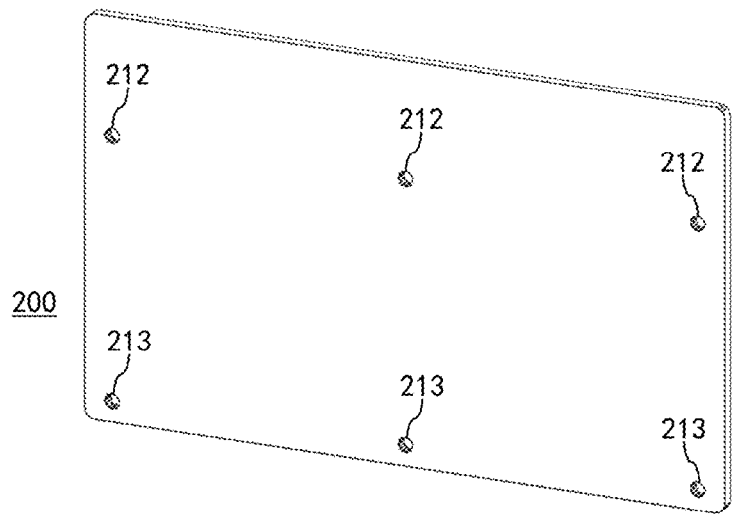
FIG. 1 is a perspective-view schematic diagram illustrating the structure for the backboard according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

FIG. 1 is a perspective-view schematic diagram illustrating the structure for the backboard according to the present invention. In some embodiments, the backboard 200 according to the present invention is preferably a plastic-made opaque flat panel, and there are multiple upper positioning through holes 212 and lower positioning through holes 213 formed on and through an upper part and a lower part of the backboard 200 respectively. The backboard 200 acts as a backbone or a supporting structure providing for other panels and substrates to further stack thereonto. In some embodiments, the backboard 200 is considered as a first layer or a supporting layer.

Figure 2:
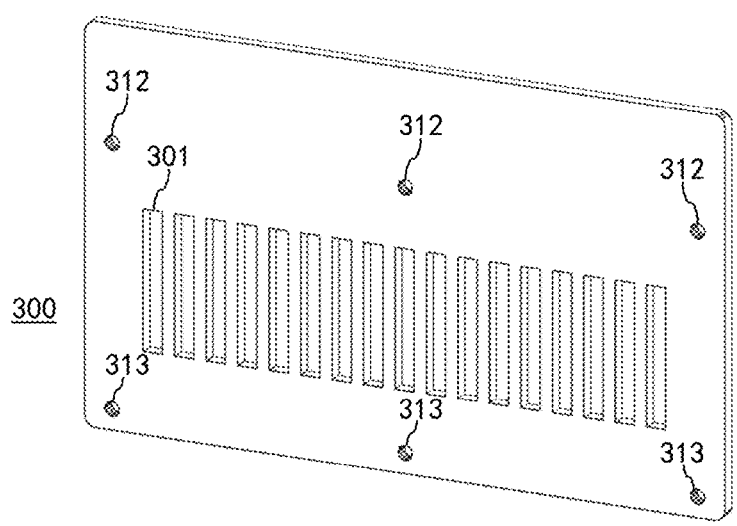
FIG. 2 is a perspective-view schematic diagram illustrating the structure for the slot substrate according to the present invention.

FIG. 2 is a perspective-view schematic diagram illustrating the structure for the slot substrate according to the present invention. In some embodiments, the slot substrate 300 according to the present invention is preferably a plastic-made opaque flat substrate. The slot substrate 300 is used for creating and providing multiple medium slots 301. The medium slots 301 are opened on and penetrated through the slot substrate 300, preferably in a shape of rectangle, have a slot width and act as a reciprocal motion channels for media. Each of the multiple medium slots 301 are used for containing one medium to slide therein and have a reciprocal motion.

There are further multiple upper through holes 312 and lower through holes 313 formed on and through the slot substrate 300, and the multiple upper through holes 312 and lower through holes 313 are corresponded to the multiple upper positioning through holes 212 and lower positioning through holes 213 formed on the backboard 200 respectively in position and in amounts, so to render the slot substrate 300 to be assembled onto the backboard 200 by these through holes. In some embodiments, the slot substrate 300 is considered as a second layer or an intermediate immobile layer.

Figure 3:
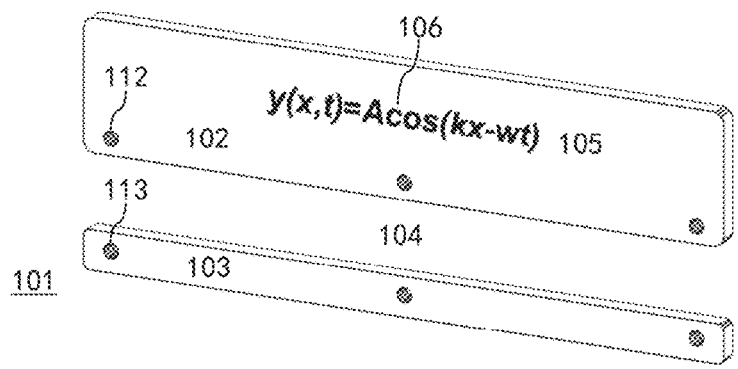
FIG. 3 is a perspective-view schematic diagram illustrating the structure for the linear track former including an upper track plate and a lower track plate according to the present invention.

FIG. 3 is a perspective-view schematic diagram illustrating the structure for the linear track former including an upper track plate and a lower track plate according to the present invention. According to the present invention, one set of the linear track former 101 includes an upper track plate 102 and a lower track plate 103. There are multiple upper track plate through holes 112 and multiple lower track plate through holes 113 opened on and penetrated through the upper track plate 102 and the lower track plate 103 respectively.

The upper track plate through holes 112 and the lower track plate through holes 113 are corresponded to the multiple upper through holes 312 and lower through holes 313 on the slot substrate 300 respectively in position, so to render the upper track plate 102 and the lower track plate 103 to be assembled onto the slot substrate 300 via these through holes.

The upper track plate 102 and the lower track plate 103 are preferably assembled onto the upper part and the lower part of the slot substrate 300 respectively. When the upper track plate 102 and the lower track plate 103 is assembled onto the slot substrate 300, there is a shallow gap found between the upper track plate 102 and the lower track plate 103 for forming a linear traveling wave channel 104.

The upper track plate 102 provides a symbol area 105 for a wave equation 106 to be printed thereonto. The wave equation 106 further includes symbols selected from a vertical position variable y, a horizontal position variable x, a time variable t, an amplitude constant A, a wavenumber k, an angular frequency ω, a sine function and a cosine function. In some embodiments, the upper track plate 102 and the lower track plate 103 are considered as a third layer or an intermediate immobile layer.

Figure 4:
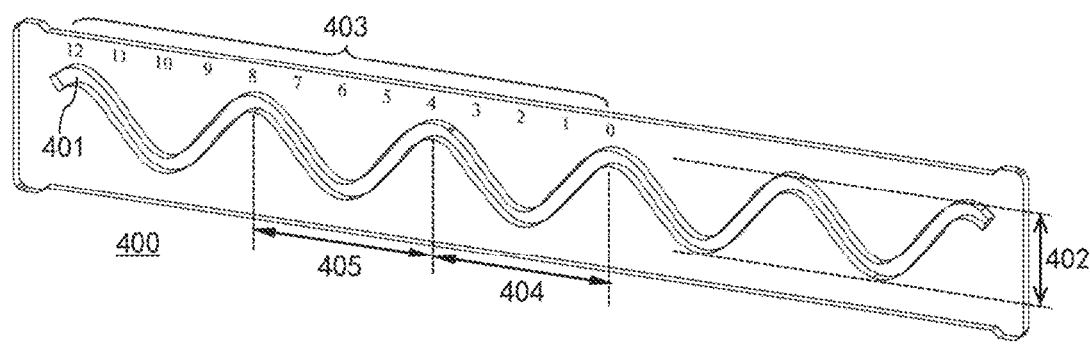
FIG. 4 is a perspective-view schematic diagram illustrating the structure for the traveling wave substrate according to the present invention.

FIG. 4 is a perspective-view schematic diagram illustrating the structure for the traveling wave substrate according to the present invention. In some embodiments, the traveling wave substrate 400 according to the present invention is preferably a plastic-made transparent flat elongated substrate and has a wave form opening 401 that are opened on and penetrated through the traveling wave substrate 400. The wave form opening 401 has an opening width, a height 402, a wave shape in sine wave or cosine wave and comprises at least two complete wave form of a first wave form 404 and a second wave form 405.

There are further multiple time scales 403 formed on the traveling wave substrate 400. Each of multiple time scales 403 are printed onto the edge area on the traveling wave substrate 400. The traveling wave substrate 400 is the only movable or slidable component, capable of horizontally sliding in the linear traveling wave channel 104 formed between the upper track plate 102 and the lower track plate 103 and used for providing the wave form opening 401 for representing a traveling wave, so to simulate the wave propagation of the traveling wave. In some embodiments, the traveling wave substrate 400 is considered as a third layer or an intermediate mobile layer.

Figure 5:
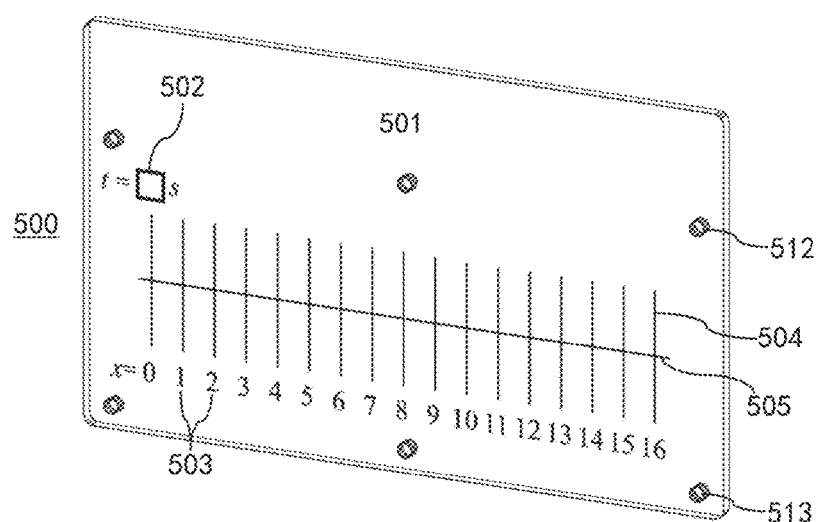
FIG. 5 is a perspective-view schematic diagram illustrating the structure for the scale display panel according to the present invention.

FIG. 5 is a perspective-view schematic diagram illustrating the structure for the scale display panel according to the present invention. In some embodiments, the scale display panel 500 according to the present invention is preferably a plastic-made transparent flat panel and has a front surface 501 facing toward a user. Further, a time window 502, multiple x-axis scales 503, multiple x-axis reference lines 504 and multiple y-axis reference lines 505 are preferably printed onto the front surface 501 on the scale display panel 500. The x-axis scales 503 is referred to as the wavelength coordinates as well.

The x-axis scales 503 printed on the scale display panel 500 are corresponded to the medium slots 301 opened on the slot substrate 300 in position and in amounts. Furthermore, there are multiple upper through apertures 512 and lower through apertures 513 formed on and through the scale display panel 500. The multiple upper through apertures 512 and lower through apertures 513 are corresponded to the multiple upper track plate through holes 112 on the upper track plate 102 and lower track plate through holes 113 on the lower track plate 103 in position.

Typically, the time window 502 on the scale display panel 500 and each of multiple time scales 403 on the traveling wave substrate 400 are configured to correspond and correlate with each other in such a way that the time window 502 is capable of showing one of multiple time scales 403 one time.

The scale display panel 500 is a topmost cover panel and acts as an information panel displaying actual scales for a majority of wave motion parameters in the wave equation 106 that are to be matched and aligned with another minority of wave motion parameters in the wave equation 106 displaying on the traveling wave substrate 400 later. In some embodiments, the scale display panel 500 is considered as a fourth layer or a topmost layer.

FIG. 6 is a perspective-view schematic diagram illustrating the structure for the media according to the present invention; The multiple media 107 as shown in FIG. 6 are preferably small colored plastic particles, each of which have a diameter preferably less than the slot width of the medium slots 301 and the opening width of the wave form opening 401.

FIG. 7 is an exploded-view schematic diagram illustrating the exploded structure for the traveling wave demonstrating device according to the present invention; FIG. 8 is a side-view schematic diagram illustrating the assembled structure for the traveling wave demonstrating device according to the present invention; and FIG. 9 is a front-view schematic diagram illustrating the assembled structure for the traveling wave demonstrating device according to the present invention.

Please refer to FIG. 7 to FIG. 9. In order to assemble the traveling wave demonstrating device 10, the slot substrate 300 is first arranged at one side of the backboard 200 by aligning the upper through holes 312 on the slot substrate 300 with the upper positioning through holes 212 on the backboard 200 and aligning the lower through holes 313 on the slot substrate 300 with the lower positioning through holes 213 on the backboard 200. The backboard 200 is the bottom structure in the lowest layer for the entire laminated structure.

Then, the upper track plate 102 and the lower track plate 103 are arranged next to the slot substrate 300 by aligning the upper track plate through holes 112 with the upper through holes 312 on the slot substrate 300 and aligning the lower track plate through holes 113 with the lower through holes 313 on the slot substrate 300 respectively.

Next, the traveling wave substrate 400 is placed into a shallow gap acting as the linear traveling wave channel 104 formed between the upper track plate 102 and the lower track plate 103. Multiple media 107 are put into intersections of the multiple medium slots 301 with the wave form opening 401 and retained in the multiple medium slots 301 and the wave form opening 401.

Lastly, the scale display panel 500 is covered onto the intermediate layer including the upper track plate 102, the traveling wave substrate 400 and the lower track plate 103 by aligning the upper through apertures 512 with the upper track plate through holes 112 and the lower through apertures 513 with the lower track plate through holes 113.

Multiple assembling bolts 108 are rendered to insert into and pass through multiple assembling holes consisting of the upper through apertures 512, the upper track plate through holes 112, the upper through holes 312 successively and the upper positioning through holes 212 and the lower through apertures 513, the lower track plate through holes 113, the lower through holes 313 and the lower positioning through holes 213 successively. Preferably, each assembling bolts 108 have an overall length larger than the through depth that each assembling holes have.

Therefore, each assembling bolts 108 have exposed segments that is exposed out of from and above the assembling hole at two end. Multiple assembling nuts 109 are screwed onto the exposed segments at two ends of each assembling bolts 108 to secure the entire stacked laminated structure. As a result, the traveling wave demonstrating device 10 according to the present invention is formed.

Alternatively, on the other hand, the assembled traveling wave demonstrating device 10 has two major parts including a stationary part, a base structure 100, and a movable part, the traveling wave substrate 400. The stationary part, the base structure 100 includes the backboard 200, the slot substrate 300, the upper track plate 102, the lower track plate 103 and the scale display panel 500. The movable part, the traveling wave substrate 400, moves or slides over the base structure 100.

After the assembling is correctly done, in the entire traveling wave demonstrating device 10, the traveling wave substrate 400 is the only movable part. By receiving an external push or pull force from a user, the traveling wave substrate 400 slides horizontally along and within the linear traveling wave channel 104 to simulate the wave propagation for a traveling wave.

The scale display panel 500 is the topmost structure, and a user can clearly view the time window 502, the multiple x-axis scales 503, multiple x-axis reference lines 504 and multiple y-axis reference lines 505 that are printed on the front surface 501 of the scale display panel 500. Because the scale display panel 500 is transparent, a user can further clearly view the wave equation 106 printed on the upper track plate 102 configured thereunder, and see the multiple time scales 403 formed on the traveling wave substrate 400 configured thereunder overlapping with the time window 502 on top of it. Moreover, since both the scale display panel 500 and the traveling wave substrate 400 are transparent, a user can clearly view the colored media 107, as well as, observe movements from the colored media 107.

The traveling wave substrate 400 is capable of sliding horizontally along the linear traveling wave channel 104 toward a first movement direction 110. When the traveling wave substrate 400 moves, the medium 107 contained in the wave form opening 401 is driven by the moved wave form opening 401 to have a reciprocal motion within the medium slots 301 having a second movement direction 111 that is perpendicular to the first movement direction 110. Every time when the traveling wave substrate 400 moves, at least one of multiple time scales 403 printed on the traveling wave substrate 400 enters into the time window 502 formed on the scale display panel 500.

Figure 10:
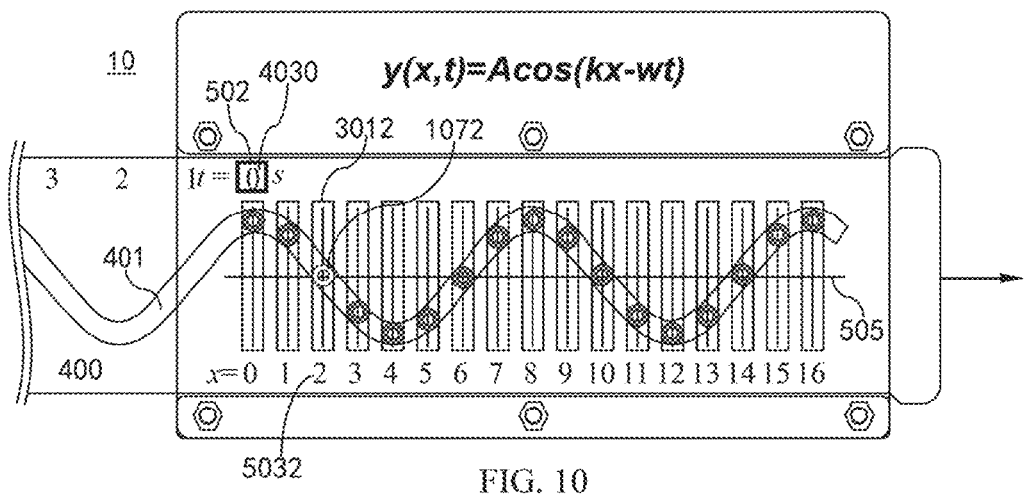
FIG. 10, FIG. 11 and FIG. 12 are front-view schematic diagrams respectively illustrating multiple transitional states at t=0 second, t=1 second and t=2 seconds out of a series of consecutive demonstration showing a continuous wave propagation for the traveling wave presented by a first embodiment based on the traveling wave demonstrating device according to the present invention.
Figure 11:
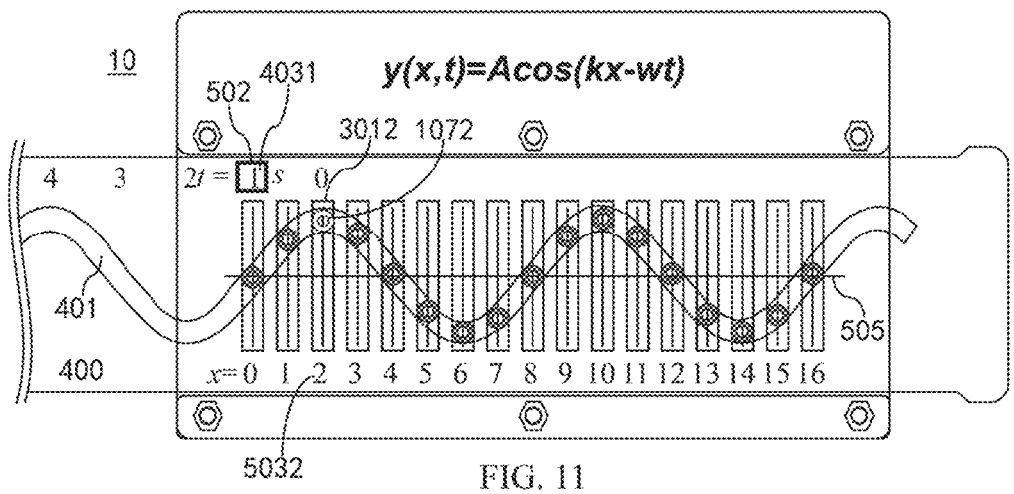
Figure 12:
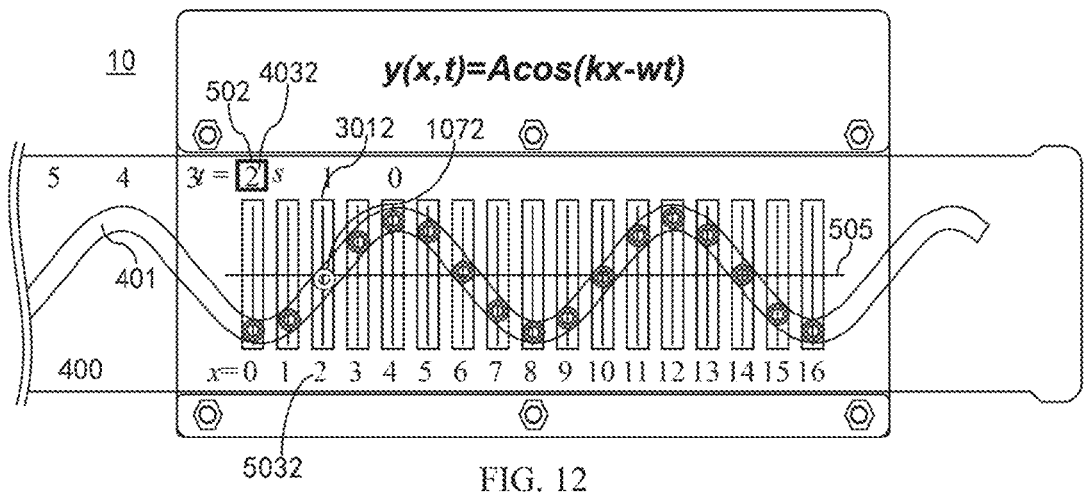

FIG. 10, FIG. 11 and FIG. 12 are front-view schematic diagrams respectively illustrating multiple transitional states at t=0 second, t=1 second and t=2 seconds out of a series of consecutive demonstration showing a continuous wave propagation for the traveling wave presented by a first embodiment based on the traveling wave demonstrating device according to the present invention.

In the first embodiment, each intervals between each x-axis scales are preferably 1 centimeter (cm), and the traveling wave formed on and simulated by the wave form opening 401 on the traveling wave substrate 400 moves toward a propagation direction and has a wave period (T) of 4 seconds and a wave length of 8 cm. It is also read from FIG. 10 the distance and temporal interval between each crests and each troughs on the wave form opening 401 are 8 cm and 4 seconds respectively.

In this embodiment, the traveling wave substrate 400 is driven by a drag force from a user and continuously slides toward a right-hand side direction, to simulate a horizontally propagated traveling wave at least through a half of wave period (T/2).

At an initial stage, the 0th second time scale 4030 representing zero second for the wave traveling time is resided and appears in the time window 502, as shown in FIG. 10. At the same time, the second medium 1072 in white color that is retained in the second medium slot 3012 corresponded to the second x-axis scale 5032 is currently located at a starting point at y=0 for a horizontal position according to the y-axis reference line 505, where is the middle section of the second medium slot 3012.

At a second stage, the user keeps dragging the traveling wave substrate 400 to continuously slide toward the right-hand side direction. With the wave traveling, the 0th second time scale 4030 moves out of the time window 502 and the 1st second time scale 4031 representing the 1st second for the wave traveling time enters into the time window 502 instead, and the current time varies to 1st second, as shown in FIG. 11.

During the second stage, the second medium 1072 is driven by the moved wave form opening 401 and ascends up to the crest part of the wave form opening 401 and the topmost part of the second medium slot 3012. For the simulated traveling wave, it travels a quarter of wave period (T/4).

At a third stage within the half period, the 2nd second time scale 4032 representing the 2nd second for the wave traveling time enters into the time window 502, and the current time varies to 2nd seconds, as shown in FIG. 12. At this stage, the second medium 1072 is driven to fall down to the middle part of the second medium slot 3012 and return to the starting point.

Within this half period, the second medium 1072 retained within the second medium slot 3012 has been experienced to begin moving from the starting point, then go up to the topmost part of the second medium slot 3012 and return to the starting point finally. For the simulated traveling wave, it consumes 2 seconds in time and a half of wave period to travel a total distance of 4 cm in space.

Within this half period, the traveling wave demonstrating device 10 according to the present invention specifically demonstrate an abstract physical phenomenon for the traveling wave that the particle periodically oscillates in situ and does not march forward with the wave propagation by the demonstration that the second medium 1072 performs a reciprocal motion in situ constrained by the second medium slot 3012. The second medium 1072 performs the reciprocal motion confined within the medium slots 301 having a reciprocal direction perpendicular to the propagation direction. Even though the traveling wave substrate 400 keeps being dragged toward the right-hand side direction, the second medium 1072 still keep performing the reciprocal motion in situ.

Figure 13:
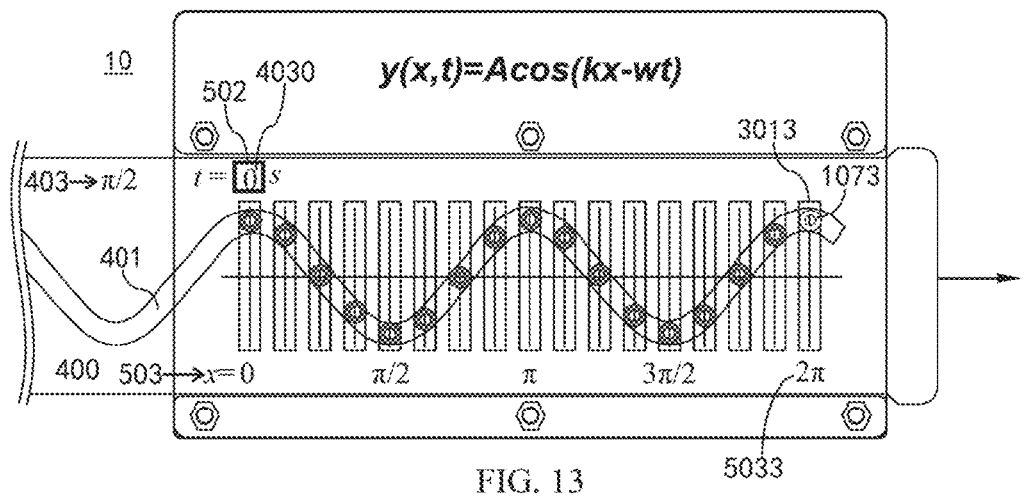
FIG. 13, FIG. 14 and FIG. 15 are front-view schematic diagrams respectively illustrating multiple transitional states at t=0 second, t=π/2 seconds and t=π seconds out of a series of consecutive demonstration showing a continuous wave propagation for the traveling wave presented by a second embodiment based on the traveling wave demonstrating device according to the present invention.
Figure 14:
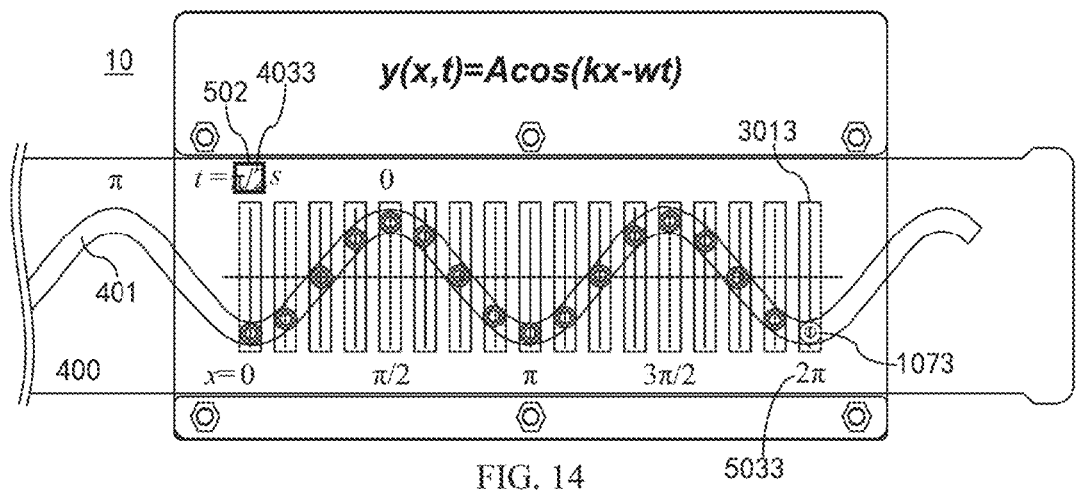
Figure 15:
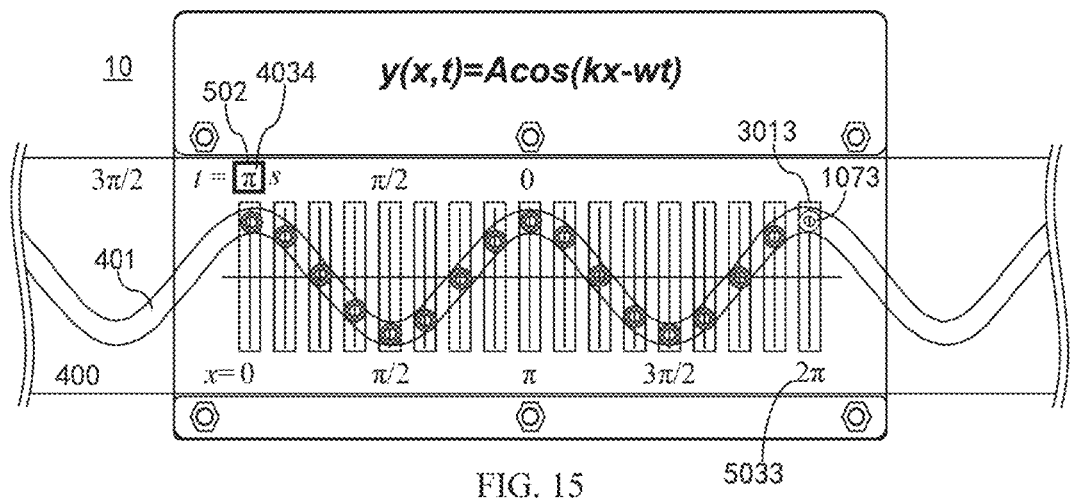

FIG. 13, FIG. 14 and FIG. 15 are front-view schematic diagrams respectively illustrating multiple transitional states at t=0 second, t=$\pi$/2 seconds and t=$\pi$ seconds out of a series of consecutive demonstration showing a continuous wave propagation for the traveling wave presented by a second embodiment based on the traveling wave demonstrating device according to the present invention. The present second embodiment is based upon the first embodiment and includes all features described in the first embodiment.

In this embodiment, the multiple x-axis scales 503 and the multiple time scales 403 are labeled in the unit of angular frequency. The traveling wave substrate 400 is driven to travel toward a right-hand side direction and through a complete wave period. The simulated traveling wave has a wave period of it seconds and a wave length of $\pi$ cm.

In this embodiment, the $2\pi$ medium 1073 is retained in the $2\pi$ medium slot 3013 corresponded to the $2\pi$ x-axis scale 5033. The traveling wave propagates from 0 second to $\pi$/2 seconds to it seconds. The time window 502 displays the 0th second time scale 4030, the $\pi$/2th second time scale 4033 and the $\pi$th second time scale 4034 sequentially by the variation of time.

Within this full wave period, originally the $2\pi$ medium 1073 is located at the topmost part of the $2\pi$ medium slot 3013 as a starting point when the time is at zero second. Next, the $2\pi$ medium 1073 descends down to the bottommost part of the $2\pi$ medium slot 3013 when the time varies to the $\pi$/2th seconds. Lastly, the $2\pi$ medium 1073 returns to the starting point when the time varies to the $\pi$th seconds.

In this embodiment, the present traveling wave demonstrating device 10 clearly shows that the 2π medium 1073 performs a complete a reciprocal motion in situ by the constrain of 2π medium slot 3013 during the propagation of the traveling wave modelled by the movement of the wave form opening 401 on the traveling wave substrate 400.

The present invention is a visualized based teaching aid having mobile structure, which is not only capable of demonstrating many observable characteristics for traveling wave including but not limited to: the direction of wave propagation different from the vibrating direction of medium and the medium performing a reciprocating motion in situ, but also provides understandable visual elements including a time window and a wavelength coordinates or x-axis scales for learner to visually study and understand the variables including a wavelength, a wave frequency, an angular frequency, a wave speed and a phase of wave appearing in the wave equation. The present invention is a lightweight, portable and well-performed scientific experiment teaching aid.

The present invention is characterized by light weight and visualization and further has more characteristics as follows: handheld; portable; miniaturized; paper-based; printing-made; non-electronic device; and non-electric driven.

There are further embodiments provided as follows.

Embodiment 1: A traveling wave demonstrating device includes a base structure including a time window, a plurality of x-axis scales, a plurality of medium slots and a set of linear track former to form a traveling wave channel, each of which the plurality of medium slots are providing for a medium to have a free motion therein; and a traveling wave substrate movably configured on the traveling wave channel and including a plurality of time scales and a wave form opening, wherein the medium is configured to put into both the wave form opening and one of the plurality of medium slots, and when the traveling wave substrate moves along the traveling wave channel, the medium is driven to have a reciprocal motion confined in the one of the plurality of medium slots.

Embodiment 2: The traveling wave demonstrating device as described in Embodiment 1, the base structure further includes one of a backboard; a slot substrate selectively attached to the backboard and including the plurality of medium slots; and a scale display panel including the time window and the plurality of x-axis scales that are corresponded to the plurality of medium slots in position and in amounts, wherein the time window is corresponded to one of the plurality of time scales in position.

Embodiment 3: The traveling wave demonstrating device as described in Embodiment 2, the set of linear track former further includes one of an upper track plate attached to the slot substrate and including a symbol area showing a wave equation including a symbol selected from one of a vertical position variable y, a horizontal position variable x, a time variable t, an amplitude constant A, a wavenumber k, an angular frequency w, a sine function and a cosine function; and a lower track plate attached to the slot substrate, wherein the traveling wave channel is formed between the upper track plate and the lower track plate; and the scale display panel attached to the upper track plate and the lower track plate.

Embodiment 4: The traveling wave demonstrating device as described in Embodiment 3, the wave form opening has a height and a wave shape in sine wave or cosine wave and includes at least two complete wave form.

Embodiment 5: The traveling wave demonstrating device as described in Embodiment 4, the plurality of x-axis scales represents the horizontal position variable x in the wave equation, the plurality of time scales represents the time variable t in the wave equation, a current position of the medium in the one of the plurality of medium slots represents the vertical position variable y in the wave equation, the height of the wave form opening represents the amplitude constant A in the wave equation, and the wave shape represents the sine function or the cosine function.

Embodiment 6: The traveling wave demonstrating device as described in Embodiment 3, the plurality of x-axis scales and the plurality of time scales are corresponded and correlated with each other in position and labeled in phase angle to represent the wavenumber k and the angular frequency w in the wave equation respectively.

Embodiment 7: The traveling wave demonstrating device as described in Embodiment 1, when the traveling wave substrate is driven to move horizontally along the traveling wave channel to simulate a traveling wave with a wave propagation, the result that the medium is confined in the one of the plurality of medium slots to have the reciprocal motion demonstrates a physical phenomenon for the traveling wave that a particle periodically oscillates in situ rather than moves forward with the wave propagation.

Embodiment 8: The traveling wave demonstrating device as described in Embodiment 1, the scale display panel and the traveling wave substrate are a transparent element, such that a user can view the free motion of the medium and read one of the plurality of time scales entering into the time window.

Embodiment 9: The traveling wave demonstrating device as described in Embodiment 1, the base structure and the traveling wave substrate further include a ruler scale configured at an edge area, which provides for a user to use the base structure and the traveling wave substrate as a ruler.

Embodiment 10: The traveling wave demonstrating device as described in Embodiment 1, the base structure and the traveling wave substrate comprise a material selected from a paper based material, a PET based material, a PE based material, a HDPE based material, a PVC based material, a PP based material, a PC based material, a PLA based material, a metal alloy and a combination thereof.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A traveling wave demonstrating device, comprising:
a base structure comprising a time window, a plurality of x-axis scales, a plurality of medium slots and a set of linear track former to form a traveling wave channel, each of which the plurality of medium slots are providing for a medium to have a free motion therein; and
a traveling wave substrate movably configured on the traveling wave channel and comprising a plurality of time scales and a wave form opening, wherein the medium is configured to put into both the wave form opening and one of the plurality of medium slots, and when the traveling wave substrate moves along the traveling wave channel, the medium is driven to have a reciprocal motion confined in the one of the plurality of medium slots.

2. The traveling wave demonstrating device as claimed in claim 1, wherein the base structure further comprises one of:
a backboard;
a slot substrate selectively attached to the backboard and comprising the plurality of medium slots; and
a scale display panel comprising the time window and the plurality of x-axis scales that are corresponded to the plurality of medium slots in position and in amounts, wherein the time window is corresponded to one of the plurality of time scales in position.

3. The traveling wave demonstrating device as claimed in claim 2, wherein the set of linear track former further comprises one of:
an upper track plate attached to the slot substrate and comprising a symbol area showing a wave equation comprising a symbol selected from one of a vertical position variable y, a horizontal position variable x, a time variable t, an amplitude constant A, a wavenumber k, an angular frequency w, a sine function and a cosine function; and
a lower track plate attached to the slot substrate, wherein the traveling wave channel is formed between the upper track plate and the lower track plate; and
the scale display panel attached to the upper track plate and the lower track plate.

4. The traveling wave demonstrating device as claimed in claim 3, wherein the wave form opening has a height and a wave shape in sine wave or cosine wave and comprises at least two complete wave form.

5. The traveling wave demonstrating device as claimed in claim 4, wherein the plurality of x-axis scales represents the horizontal position variable x in the wave equation, the plurality of time scales represents the time variable t in the wave equation, a current position of the medium in the one of the plurality of medium slots represents the vertical position variable y in the wave equation, the height of the wave form opening represents the amplitude constant A in the wave equation, and the wave shape represents the sine function or the cosine function.

6. The traveling wave demonstrating device as claimed in claim 3, wherein the plurality of x-axis scales and the plurality of time scales are corresponded and correlated with each other in position and labeled in phase angle to represent the wavenumber k and the angular frequency w in the wave equation respectively.

7. The traveling wave demonstrating device as claimed in claim 1, wherein when the traveling wave substrate is driven to move horizontally along the traveling wave channel to simulate a traveling wave with a wave propagation, the result that the medium is confined in the one of the plurality of medium slots to have the reciprocal motion demonstrates a physical phenomenon for the traveling wave that a particle periodically oscillates in situ rather than moves forward with the wave propagation.

8. The traveling wave demonstrating device as claimed in claim 1, wherein the scale display panel and the traveling wave substrate are a transparent element, such that a user can view the free motion of the medium and read one of the plurality of time scales entering into the time window.

9. The traveling wave demonstrating device as claimed in claim 1, wherein the base structure and the traveling wave substrate further comprise a ruler scale configured at an edge area, which provides for a user to use the base structure and the traveling wave substrate as a ruler.

10. The traveling wave demonstrating device as claimed in claim 1, wherein the base structure and the traveling wave substrate comprise a material selected from a paper based material, a PET based material, a PE based material, a HDPE based material, a PVC based material, a PP based material, a PC based material, a PLA based material, a metal alloy and a combination thereof.

* * * * *